United States Patent

Mindler et al.

[15] 3,659,798
[45] May 2, 1972

[54] COIL SPRING SLIP CLUTCH

[72] Inventors: Fredric A. Mindler; Charles E. Pickering, both of Rochester, N.Y.

[73] Assignee: Eastman Kodak Company, Rochester, N.Y.

[22] Filed: June 5, 1970

[21] Appl. No.: 43,898

[52] U.S. Cl. ............................................242/71.3, 192/56 C
[51] Int. Cl. ..............................................................G03b 1/10
[58] Field of Search ............................242/71.3, 71.4, 71.5; 192/56 C; 64/30 R, 30 C, 30 E, 15 C

[56] References Cited

UNITED STATES PATENTS

| | | | |
|---|---|---|---|
| 3,481,553 | 12/1969 | Karikawa | 242/71.5 |
| 2,751,987 | 6/1956 | Kiekhaefer | 64/30 X |
| 2,914,268 | 11/1959 | Tafel | 242/71.5 |
| 2,575,012 | 11/1951 | Harvey | 242/71.4 |

*Primary Examiner*—George F. Mautz
*Assistant Examiner*—Edward J. McCarthy
*Attorney*—Robert W. Hampton and D. Peter Hochberg

[57] ABSTRACT

A coil spring slip clutch adapted for use in a roll film camera for advancing a film strip within the camera. The clutch comprises a rotatably mounted cylindrical drive shaft having a smooth surface portion around which the coils of a coil spring are tightly wrapped. One end of the coil spring is bent outwardly so as to drivingly engage a film advancing mechanism when the shaft is rotated. The contacting surfaces of the coil spring and drive shaft are selected from materials which remain in frictional engagement sufficient to cause the coil spring to drive the film advancing mechanism until the retarding force exerted by such mechanism exceeds a critical frictional force characteristic of one of the materials, at which time the coil spring slips relative to the drive shaft.

4 Claims, 3 Drawing Figures

Patented May 2, 1972
3,659,798
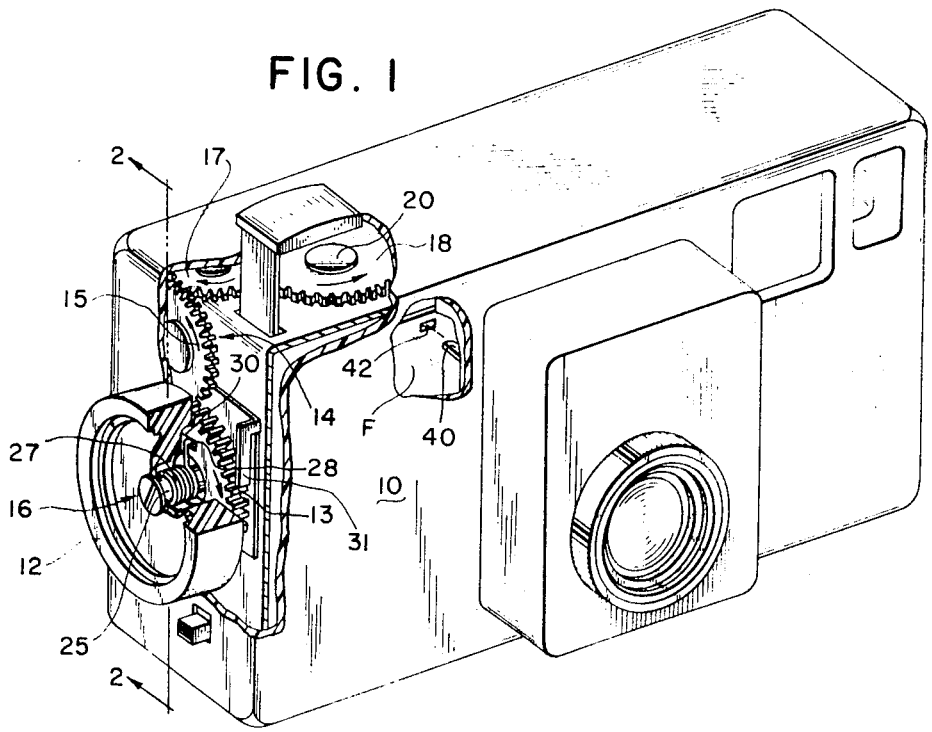
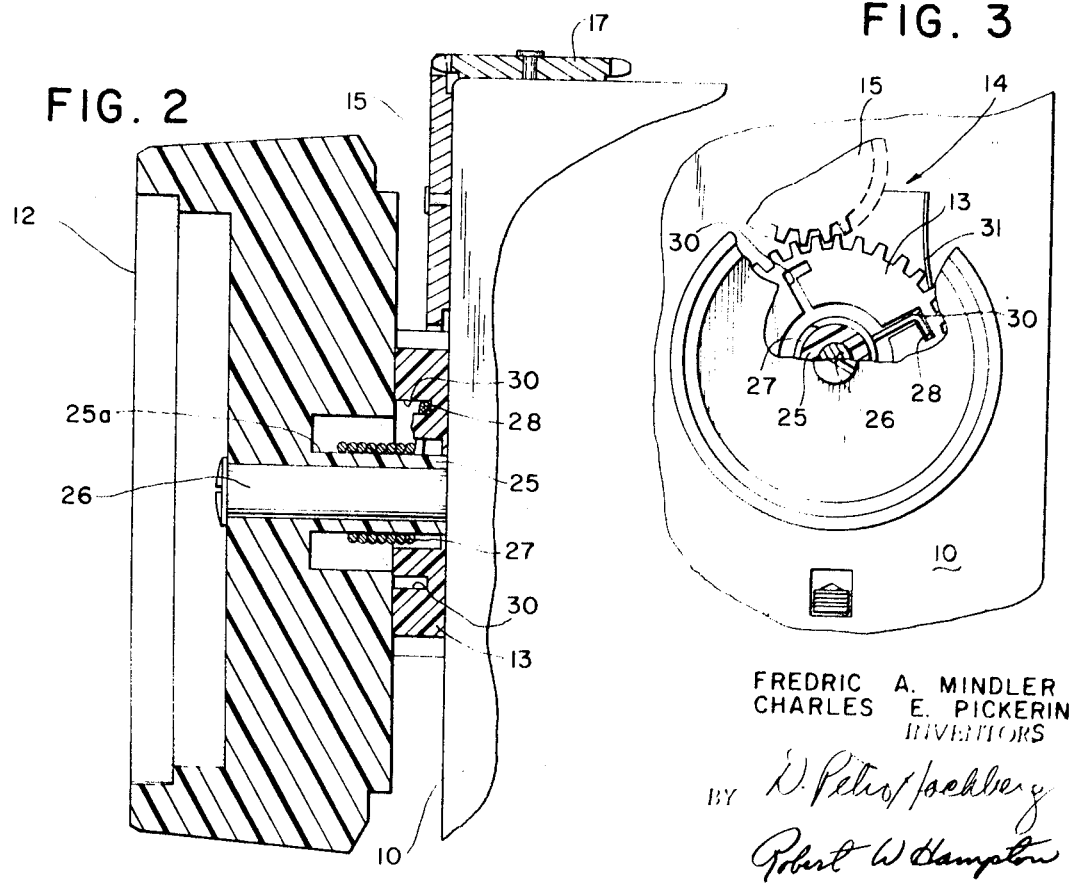
FREDRIC A. MINDLER
CHARLES E. PICKERING
INVENTORS
BY D. Peter Jackberg
Robert W. Hampton
ATTORNEYS 3,659,798

COIL SPRING SLIP CLUTCH

BACKGROUND OF THE INVENTION

1. Field of the Invention

The present invention relates to photographic cameras of the type adapted to receive film supplied in roll form. More specifically, this invention relates to improvements in winding apparatus adapted for use in such cameras for incrementally advancing film strip from the film supply chamber, across an exposure plane, to the take-up chamber of the camera.

2. Description of the Prior Art

Many roll film cameras are provided with a manually operable film advance member such as a movable knob or lever on the exterior of the camera housing for transporting film strip in the camera from the supply chamber, across the exposure plane, and to the take-up chamber, wherein it is commonly wound upon a take-up spool. The chambers and exposure plane are frequently defined by an integral film cartridge incorporating a spool in the take-up chamber, the spool being rotatable by a drive member in response to operation of the camera film advance member to withdraw film from the supply chamber and wind it on the spool. In other cameras, the film winding knob or lever is operably coupled to a drive member in the form of a film advancing sprocket wheel which engages perforations on the lateral edges of the film to withdraw the film from the supply chamber for winding about a take-up spool. The film drive member is usually coupled to the film advance member by a rotatably mounted winding shaft, and is commonly positioned within or adjacent the film take-up chamber. In order to advance the film strip in single exposure frame increments, it is common to provide a metering device for stopping further rotation of the drive member as frames of film are sequentially advanced to the exposure plane from the supply chamber. A common expedient for precluding damage to the winding apparatus and/or film by an over zealous camera operator who continues to exert a torque on the winding shaft after the metering device has been activated to prevent further film advancement, is to employ a slip type clutch or coupling between the winding shaft and the film drive member. By this arrangement, the winding shaft will only drivingly engage the drive member until the retarding force exerted on the winding shaft in response to the activation of the metering device increases beyond a predetermined value, at which time further winding only causes the winding shaft to slip relative to the film drive member.

Exemplary of slip clutch film winding mechanisms of the general type described above is the apparatus disclosed in U.S. Pat. No. 3,481,553 issued to Toru Karikawa. There, a slip clutch comprises a coil spring, the coils of which are arranged to encircle and closely engage a winding shaft rotatable by a film advancing member. Each end of the coil terminates in a radially projecting leg portion. One such leg portion is arranged to drivingly engage a film drive gear whenever the winding shaft is rotated in the direction tending to tighten the spring coils about the shaft. Due, in part, to the mass of the film drive gear, a retarding force is exerted on the coil spring leg which effects a tightening of the coil spring about the winding shaft to prevent slippage of the coil on the shaft. Upon rotating the winding shaft a sufficient amount to advance the film a predetermined incremental distance (i.e., the length one exposure frame), means are provided for urging the other radially extending leg of the coil spring in a direction as to loosen the coils on the winding shaft to permit the winding shaft to rotate freely within the spring coils. Although the slip clutch disclosed by Karikawa appears to satisfy its intended purpose, it relies on a mechanical coupling between a radially extending leg of the coil spring and a film metering mechanism for loosening the grip of the coil spring at a precise instant before damage to the winding mechanism occurs. This addition of a mechanical coupling to a camera has the disadvantage of adding expense thereto and of being a potential source of mechanical failure, and its replacement by a less complex clutching mechanism would be desirable.

SUMMARY OF THE INVENTION

The present invention provides an improved slip clutch for a roll film camera comprising a rotatably mounted film winding shaft, and a coil spring encircling the winding shaft so that it is in frictional engagement with the shaft, the spring including a single outwardly extending end portion for engaging and displacing a film drive member when the shaft is rotated. The surface of the winding shaft comprises a material having a critical friction force value such that, upon the exertion by the coils of a frictional force having a magnitude equal to or greater than the critical value, the coils slip relative to the surface. This critical value is selected to occur when the camera film metering device is activated in response to the advancement of a frame of film. Accordingly, the retarding force exerted by the activated film metering device on the film drive mechanism exceeds the critical frictional force between the winding shaft and the coil spring, so that the winding shaft is rotatable relative to the spring coils. Suitable surface materials for the winding shaft, when used with a metal coil spring, are Celcon (copolymer acetal resin) or Delrin (homopolymer acetal resin).

The invention, and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawing in which:

FIG. 1 is an isometric view of a roll film camera in which a portion of the camera housing is cut away to expose a preferred embodiment of the invention;

FIG. 2 is an enlarged cross-sectional view of the slip clutch portion of the film winding mechanism illustrated in FIG. 1 taken along the line 2—2 with the camera housing omitted for clarity; and FIG. 3 is a fragmentary end view of the camera illustrated in FIG. 1 wherein a portion of the film winding knob is cut away to expose a portion of the slip clutch and film advancing mechanism.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Referring now to FIG. 1, a portion of the housing 10 of a roll film camera is shown cut-away to expose a portion of a slip clutch film winding apparatus according to the invention. The apparatus generally comprises a film winding knob 12 which is rotatable in the clockwise direction to drive a film advancing gear train 14 through a slip clutch 16, gear train 14 including gears 13, 15, 17 and 18 which are rotated in the directions indicated by the arrows in response to the aforemention rotation of knob 12. The last gear 18 of gear train 14 is keyed to a film take-up spool 20, which can be a component of the camera, or the spool in the take-up chamber of a film cartridge. Thus, when spool 20 has the leading end of a film roll thereto, the clockwise rotation of knob 12, and the corresponding rotation of gear 18, causes spool 20 to draw film F from the film supply chamber (not shown) across the exposure plane of the camera and into the film take-up chamber, wherein it is wound upon take-up spool 20. As indicated previously, gear 18 could instead be adapted to rotate a film sprocket for effecting film transportation.

As best shown in FIG. 2, winding knob 12 is integral with a generally tubular drive shaft 25. The winding knob and drive shaft are supported by, and free to rotate on, a shouldered stud 26 which extends perpendicularly outward from the camera housing 10 on which it is mounted. Preferably, the winding knob and its integral drive shaft are molded from Celcon or Delrin, whereby the outer radial surface 25a of the drive shaft slips relative to an object in contact therewith once a critical frictional force exists between the shaft and the object. Alternatively, the shaft could be fabricated from any material having a coating of a material exhibiting a similar decrease in resistance in response to the reaching of a critical frictional force characteristic of the material.

Encircling the outer cylindrical surface of drive shaft 25 is a coil spring 27. The inside diameter of the coils forming coil spring 27 is such as to provide an interference fit on drive shaft 25. Thus, whenever drive shaft 25 is rotated, coil spring 27 tends to rotate therewith so long as the critical frictional force is not reached. A free end 28 of coil spring 27 is bent outwardly from the coil portion and is formed in such a manner as to engage one of a set of radially disposed pockets 30 formed in the outer surface of the first gear 13 of the film advancing gear train 14. Gear 13 is journaled for rotation about drive shaft 25 in response to the rotation of spring 27 about that shaft. The preferred configuration of end portion 28 of the coil spring 27 and of pockets 30 formed in gear 13 are best shown in FIG. 3. The premature rotation of gear 13 in the reverse of counterclockwise direction under the influence of spring 27 is prevented by the engagement of leaf spring 31, which engages the teeth of gear 13 so that gear 13 and spring 31 act as a pawl and ratchet.

In operation, film F is advanced from the film supply chamber to the take-up chamber by rotating knob 12 and its integral drive shaft 25 in a clockwise direction. Such rotation initially rotates spring 27 in the same direction and, because of the engagement of the formed end 28 of coil spring 27 with pocket 30, gear 13 is likewise urged in a clockwise direction. Gear 13, because of its mass and its engagement with other gears of the gear train 14, exerts a retarding force on the formed end of the coil spring as knob 12 rotates. As a result of the direction in which the coils of spring 27 are wound about drive shaft 25, this retarding force tends to tighten the coil portion of the spring about the drive shaft. Continued rotation of drive shaft 25 in a clockwise direction tightens coil spring 27 about the drive shaft to thereby increase the frictional force between these elements. When the retarding force exerted by gear train 14 is overcome by the force exerted thereon by spring 27, the gears comprising the gear train rotate in the directions indicated by the arrows to effect the winding of film upon take-up spool 20. In response to the winding of a length of film equal to an exposure frame upon the take-up spool, the film metering means impede further rotation of take-up spool 20. Such impedence can result, for example, when a rearwardly biased metering pawl 40 (FIG. 1) enters a film metering perforation 42 and blocks the film against further displacement. Activation of the metering means serves to increase the retarding force exerted by gear train 14 on coil spring 27 because the pawl holds the film back against the force tending to pull the film in the film advancing direction. When this retarding force exceeds the critical frictional force characteristic of the material of which shaft 25 is fabricated, drive shaft 25 slips relative to coil spring 27, and further rotation of winding knob 12 thus produces no further rotation of take-up spool 20. Conventional means can be provided for withdrawing pawl 40 from perforation 42 after the making of an exposure to make possible the advancement of the film to position a new frame in the exposure plane of the camera.

Rotation of winding knob 12 and its drive shaft 25 in a counterclockwise direction urges the coil spring in a like direction. Because of the retarding force exerted by the gear train on the formed end 28, the coil portion tends to unwind and loosen its grip on the winding shaft. Thus, a counterclockwise rotation of the winding knob permits drive shaft 25 to rotate freely relative to the coil spring, so that the device displays a one-way clutch capability.

The invention has been described in detail with particular reference to a preferred embodiment thereof, but it will be understood that variations and modifications can be effected within the spirit and scope of the invention.

We claim:

1. A film advancing apparatus for transporting predetermined incremental lengths of film strip in a roll film camera, said apparatus comprising:
  a housing;
  a drive shaft rotatably mounted in said housing;
  a helical spring including (1) coils encircling said drive shaft in a direction to tighten said coils about said shaft when said shaft is rotated in a first direction, said helical spring and said drive shaft being in frictional engagement and having a critical friction force value such that said spring is rotated in said first direction in response to the rotation of said drive shaft in the first direction when the friction force between said spring and said shaft is less than said critical value, and said shaft is rotatable in the first direction relative to said spring when the friction force between said spring and said shaft is equal to or greater than said critical value, and (2) an engageable end portion extending from said coils; and
  means movable for transporting the film strip, said transporting means being (1) in driven engagement with said spring end portion and movable in response to rotation of said spring in the first direction, and (2) adapted to exert a force on said spring in response to the transportation of a predetermined length of film strip to increase the friction force between said spring and said drive shaft beyond said critical value to limit the amount of film transported by said apparatus to the predetermined incremental length.

2. Apparatus according to claim 1 wherein:
  said drive shaft has an external surface engaged with said coils, said surface (1) being in locking frictional engagement with said coils when the friction force between said surface and said coils is less than said critical value, and (2) allowing said coils to slip relative to said surface when the friction force is equal to or greater than said critical value; and
  the fit of said coils on said shaft loosens in response to rotation of said shaft in a second direction opposite to said first direction to permit the free rotation of said shaft relative to said coils.

3. Apparatus according to claim 2 wherein said surface comprises a layer of copolymer acetal resin.

4. Apparatus according to claim 2 wherein said surface comprises a layer of homopolymer acetal resin.

* * * * *